United States Patent
Correia Villa Real et al.

(10) Patent No.: US 11,221,925 B2
(45) Date of Patent: Jan. 11, 2022

(54) CONTINUOUS STORAGE OF DATA IN A SYSTEM WITH LIMITED STORAGE CAPACITY

(71) Applicant: International Business Machines Corporation, Armonk, NY (US)

(72) Inventors: Lucas Correia Villa Real, Sao Paulo (BR); Marcelo Nery dos Santos, Sao Paulo (BR); Renan Francisco Santos Souza, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/678,375

(22) Filed: Nov. 8, 2019

(65) Prior Publication Data

US 2021/0141695 A1   May 13, 2021

(51) Int. Cl.
 *G06F 11/14* (2006.01)
 *G06F 3/06* (2006.01)
(52) U.S. Cl.
 CPC .......... *G06F 11/1469* (2013.01); *G06F 3/067* (2013.01); *G06F 3/0608* (2013.01); *G06F 3/0619* (2013.01); *G06F 3/0652* (2013.01); *G06F 3/0655* (2013.01); *G06F 11/1435* (2013.01); *G06F 11/1464* (2013.01)
(58) Field of Classification Search
 CPC ............. G06F 11/1469; G06F 11/1435; G06F 3/0652; G06F 3/0655; G06F 3/0608; G06F 3/067; G06F 3/0619; G06F 11/1464
 See application file for complete search history.

(56) References Cited

U.S. PATENT DOCUMENTS

| | | | |
|---|---|---|---|
| 8,682,867 B2 | 3/2014 | Barton et al. | |
| 9,804,928 B2 | 10/2017 | Davis et al. | |
| 10,176,182 B2 | 1/2019 | Adam et al. | |
| 2013/0173559 A1 | 7/2013 | Chen | |
| 2016/0080439 A1* | 3/2016 | Bhathena | H04L 67/06 715/740 |
| 2016/0246830 A1 | 8/2016 | Chiu et al. | |
| 2017/0262204 A1* | 9/2017 | Dornemann | G06F 11/1438 |
| 2017/0371597 A1 | 12/2017 | Jia et al. | |
| 2019/0065510 A1 | 2/2019 | Pradeep et al. | |

FOREIGN PATENT DOCUMENTS

CN         107016123 A      8/2017

OTHER PUBLICATIONS

PCT Notification of Transmittal of the International Search Report and the Written Opinion of the International Searching Authority, or the Declaration for International Application No. PCT/IB2020/059698 dated Jan. 27, 2021.

* cited by examiner

*Primary Examiner* — David Yi
*Assistant Examiner* — Dustin B. Fulford
(74) *Attorney, Agent, or Firm* — Patterson + Sheridan, LLP

(57) ABSTRACT

Techniques for automatically recreating data removed from storage are disclosed. A request to access data at a first storage location is received. It is determined, based on a catalog and using a computer processor, that the data has been removed from the first storage location. In response the data at the first storage location is automatically recreated using the computer processor. The recreating includes identifying a second storage location for the data, based on the catalog, retrieving the data from the second storage location, and storing the data at the first storage location. The catalog is updated to reflect recreating the data at the first storage location.

19 Claims, 7 Drawing Sheets

CONTINUOUS STORAGE OF DATA IN A SYSTEM WITH LIMITED STORAGE CAPACITY

BACKGROUND

The present disclosure relates to electronic data storage, and more specifically, to continuous storage of data in a system with limited storage capacity.

It is becoming increasingly common for researchers to analyze very large public datasets (such as satellite imagery) to aid in various critical tasks. In some circumstances, the public data is combined with other information to derive additional data. But because these datasets can be very large, it is common to run out of storage space for the data during the analysis. For example, geological or environment researchers may analyze satellite imagery from an entire country. Attempting to save information derived from the satellite imagery, like data about crop health, the status of various roads and bodies of water, etc., can result in such a large data set that the researcher runs out of disk space. In existing systems, when an issue like that arises, an error can occur or users must decide which data to delete from the storage system before new data can be ingested and processed, which can require coordination between users and result in undesired data being deleted. That is time consuming and can be difficult to achieve, because data owners may not be around anymore and no information on how to regenerate derived information is available to the users wishing to reclaim storage space.

SUMMARY

Embodiments include a computer-implemented method. The method includes receiving a request to access data at a first storage location. The method further includes determining, based on a catalog and using a computer processor, that the data has been removed from the first storage location, and in response automatically recreating the data at the first storage location using the computer processor. The recreating includes identifying a second storage location for the data, based on the catalog, retrieving the data from the second storage location, and storing the data at the first storage location. The method further includes updating the catalog to reflect recreating the data at the first storage location.

Embodiments further include a system. The system includes a processor and a memory containing a program that, when executed on the processor, performs an operation. The operation includes receiving a request to access data at a first storage location. The operation further includes determining, based on a catalog and using a computer processor, that the data has been removed from the first storage location, and in response automatically recreating the data at the first storage location using the computer processor. The recreating includes identifying a second storage location for the data, based on the catalog, retrieving the data from the second storage location, and storing the data at the first storage location. The operation further includes updating the catalog to reflect recreating the data at the first storage location.

Embodiments further include a computer program product for automatically recreating data removed from storage, the computer program product including a computer-readable storage medium having computer-readable program code embodied therewith, the computer-readable program code executable by one or more computer processors to perform an operation. The operation includes receiving a request to access data at a first storage location. The operation further includes determining, based on a catalog and using a computer processor, that the data has been removed from the first storage location, and in response automatically recreating the data at the first storage location using the computer processor. The recreating includes identifying a second storage location for the data, based on the catalog, retrieving the data from the second storage location, and storing the data at the first storage location. The operation further includes updating the catalog to reflect recreating the data at the first storage location.

DETAILED DESCRIPTION

One or more embodiments disclosed herein relate to software services to allow users to store remotely accessible data in a local location seamlessly, without worrying about storage capacity. In an embodiment, remote data sources from which users have retrieved data are recorded in a catalog system. Statistics and information associated with the data retrieval (e.g., time to download, file size, resources used) are also stored in the catalog. The software services use this information to, when faced with limited storage capacity, automatically determine which data can be most easily retrieved and recreated. The software services can then free storage space by deleting the more easily retrieved and recreated data. If a user later requests that data, it can be seamlessly retrieved and recreated.

Further, in one or more embodiments, the software services can track scripts used to process downloaded data and derive new data. Information identifying these scripts can also be saved, along with input parameters to provide to the scripts, and can be used as a factor when determining which data to delete to free storage space. As part of the recreation of the data, the services can use these scripts and any input parameters to process the downloaded data and recreate the derived data.

Figure 1:
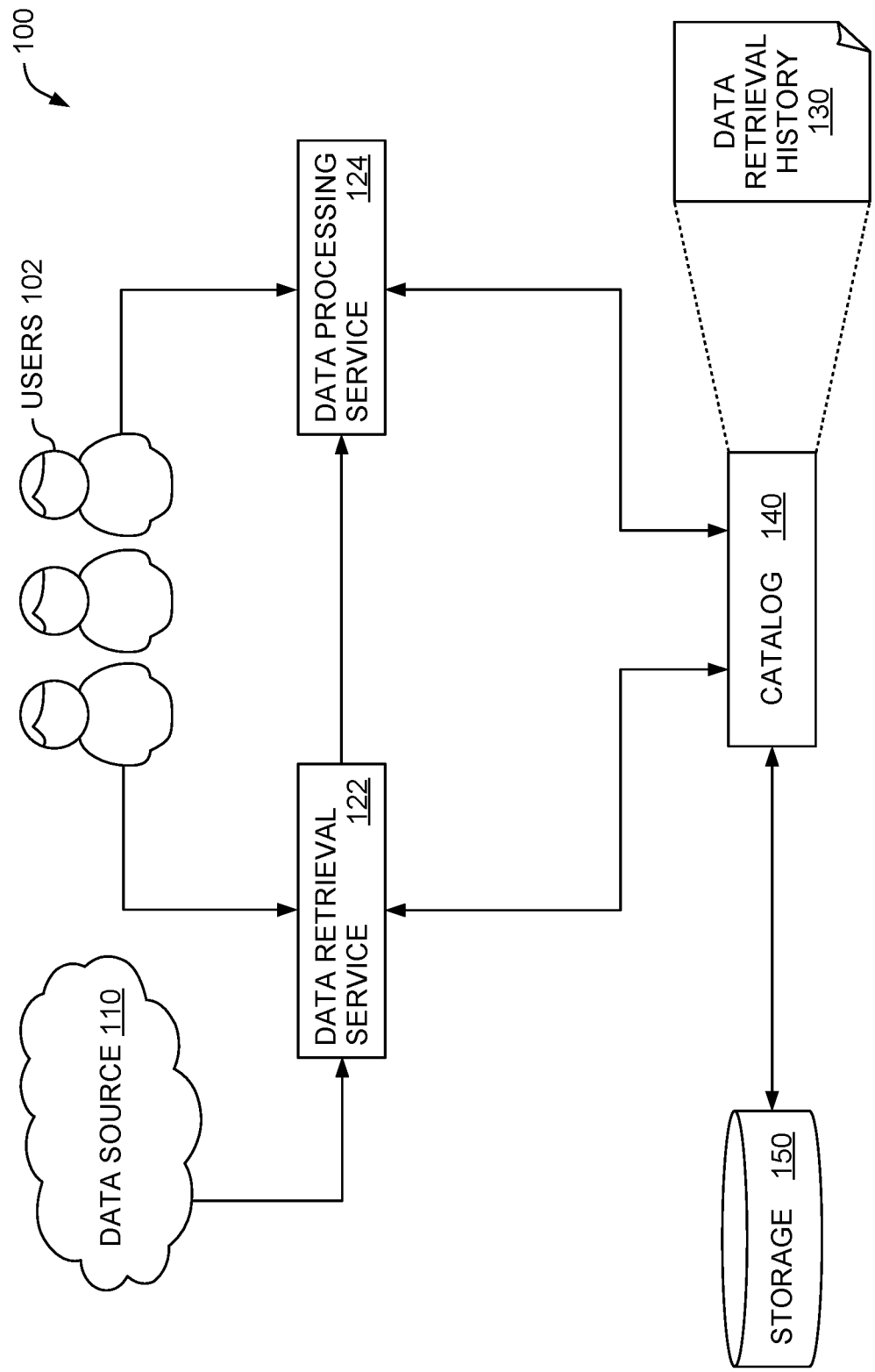
FIG. 1 illustrates storage of data in a system with limited storage capacity, according to one embodiment.

FIG. 1 illustrates storage of data in a system with limited storage capacity, according to one embodiment. A computing environment 100 includes one or more users 102. These users 102 access a data retrieval service 122 to retrieve data from a data source 110. In an embodiment, the data source 110 is publicly accessible. For example, the users 102 could be researchers using publicly available geographic data. The data source 110 could be a public data repository or website. As another example, the data source 110 can be a repository accessible using the internet, or another wide area network. A user 102 can use a user device (e.g., a laptop, desktop, smartphone, tablet, etc.) to transmit a request for data from the data source 110. This request can come from any suitable software on the user device, including a web browser, a research application, etc.

The data retrieval service 122 retrieves data from the data source 110. The data retrieval service 122 then stores the data in storage 150 (e.g., an electronic database, a cloud storage location, or a filesystem) and uses a catalog 140 to store details about the data provenance and retrieval. In an embodiment, the information stored in the catalog 140 acts as metadata identifying details about the data provenance and retrieval. For example, the catalog 140 can be a table in an electronic database (e.g., a relational database, a graph database, or any other suitable database). In an embodiment, the storage 150 is located on a computing device used by the users 102. Alternatively, the storage 150 is accessible to the users 102 using a local area network (LAN), for example an enterprise network. As another alternative, the storage 150 is accessible to the users from a dedicated remote location (e.g., a remote electronic database, a public cloud, or a private cloud) or another suitable location.

The data retrieval history 130 can be stored in the catalog 140, and can include data about the provenance (e.g., source) of received data and statistics about retrieving the data. For example, the data retrieval history 130 can include the information in table T1 below:

TABLE T1

| Data Source(s): | <URL>, <URL:mirror>, . . . |
|---|---|
| Data Size: | <bytes> |
| Time to Download: | <seconds> |
| Time to Process: | <seconds> |
| CPU Resources Used: | <# of CPUs>, <use %> |
| Memory Used: | <% use> |
| Filesystem Path: | <path1>, <path2>, . . . |

In this example, the "Data Source" row stores the address of the publicly available source for the data. For example, this row can store the uniform resource locator (URL), and a mirror URL, for the data source. The "Data Size" row stores the size of the downloaded data (e.g., in bytes). The "Time to Download" row stores the time used to download the data (e.g., in seconds).

The "Time to Process" row stores the time to process the data after download (e.g., in seconds). In an embodiment, the users 102 can use the data processing service 124 to process downloaded data using a script (e.g., performing transformations on the data or filtering the data). The original data, and processed data, or both, can be stored in the storage 150.

Further, in an embodiment, the data processing service 124 stores identifying information (e.g., a file-path, database path, network address, etc.) for any scripts used to process downloaded data (e.g., performing transformations on the data or filtering the data). For example, the data processing service 124 can store these scripts, or information identifying the location of the scripts, in the storage 150, in the catalog 240, or in any other suitable location. In an embodiment, the data processing service 124 also stores the input parameter provided to the script (e.g., in the catalog 140 or another suitable location).

When the catalog is saved in the database, the "Time to Process" row can store the time needed to perform this processing. Further, the "CPU Resources Used" row can store statistics for CPU usage during the processing (e.g., the number of CPUs used and the percentage of available processing power used) and the "Memory Used" row can store statistics for memory usage during the processing (e.g., the percentage of available memory used). The "Filesystem Path" row can store the path for the downloaded data (and, if applicable, the processed data). These are merely examples, and any suitable data can be maintained in the data retrieval history 130.

In an embodiment, the users 102 can access the data retrieval service 122 and the data processing service 124 using a suitable network connection. For example, as discussed in more detail below with regard to FIG. 3, in an embodiment the data retrieval service 122 and the data processing service 124 are software services running on one or more computer servers (e.g., running on a public or private cloud computing system). In this embodiment, the users 102 can access the data retrieval service 122 and the data processing service 124 using a LAN, a wide area network (WAN), or any other suitable network. For example, the data retrieval service 122 and the data processing service 124 can be accessible via the internet, and the users 102 can access these services using a suitable web service application programming interface (API).

Figure 2:
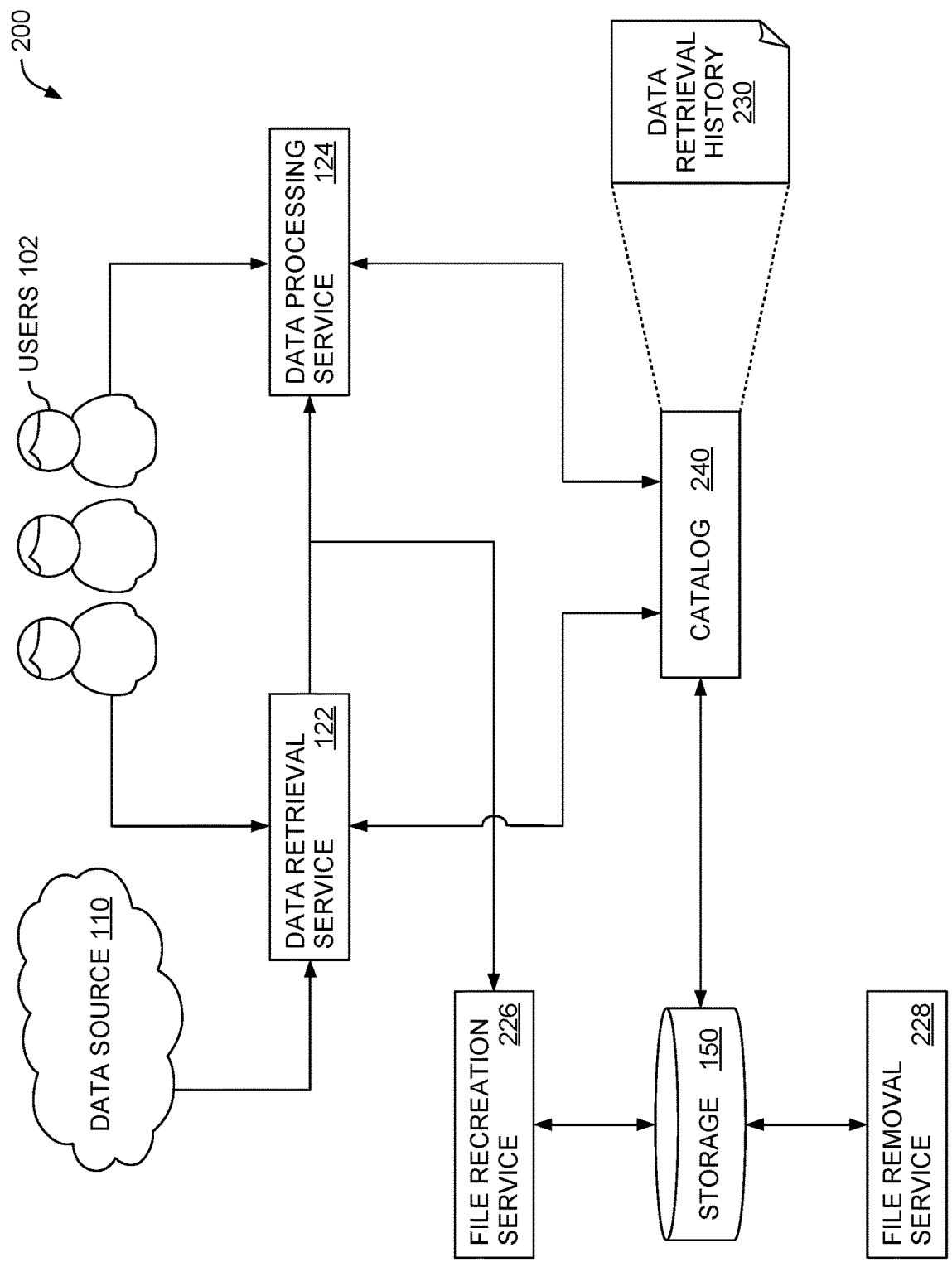
FIG. 2 illustrates software services for continuous storage of data in a system with limited storage capacity, according to one embodiment.

FIG. 2 illustrates software services for continuous storage of data in a system with limited storage capacity, according to one embodiment. Like the computing environment 100 illustrated in FIG. 1, a computing environment 200 includes one or more users 102. These users 102 access a data retrieval service 122 to retrieve data from a data source 110. For example, just as in FIG. 1, the users 102 could be researchers using publicly available geographic data. The data source 110 could be a public data repository or website. For example, the data source 110 can be a repository accessible using the internet, or another wide area network.

The data retrieval service 122 retrieves data from the data source 110. The data retrieval service 122 then stores the data in storage 150 (e.g., the storage 150 illustrated in FIG. 1) and uses a catalog 240 to store details about the data provenance and retrieval. For example, like the catalog 140 illustrated in FIG. 1, the catalog 240 can be a table in an electronic database.

The computing environment 200 includes two additional services: a file recreation service 226 and a file removal service 228. In an embodiment, the file removal service 228 facilitates removal of data from the storage 150 to allow for continuous storage of data. This is discussed in more detail with regard to FIG. 6, below.

In an embodiment, the file recreation service 226 facilitates recreation of files that have been deleted by the file removal service 228. Further, the file recreation service 226 facilitates use of any scripts by the data processing service 124 to process downloaded data (e.g., scripts identified by the data processing service 124 or another suitable service). This makes the removal of files by the file removal service transparent to the user. That is, the users 102 can operate in the computing environment 200 without any knowledge of what data is actually stored in the storage 150 and what data has been removed to save storage space. This is discussed in more detail with regard to FIGS. 4-7, below.

In an embodiment, the file recreation service 226 uses the catalog 240 to facilitate recreation of files. For example, the catalog 240 can store a data retrieval history 230. The data retrieval history 230, like the data retrieval history 130 illustrated in FIG. 1, can include data about the provenance (e.g., source) of received data and statistics about retrieving the data. The data retrieval history 230 can further include data about whether the previously retrieved data is stored in the storage 150. This data can be used as recreation parameters for the recreation service. For example, the data retrieval history 230 can include the recreation parameters in table T2 below:

TABLE T2

| | |
|---|---|
| Data Source(s): | <URL>, <URL:mirror>, . . . |
| Data Size: | <bytes> |
| Time to Download: | <seconds> |
| Time to Process: | <seconds> |
| CPU Resources Used: | <# of CPUs>, <use %> |
| Memory Used: | <% used> |
| Filesystem Path: | <path1>, <path2>, . . . |
| File Available? | <boolean> |
| Processing Script(s): | <machine:path1:input_parameters>, <machine:path2:input_parameters>, . . . |

As shown, the table T2 includes the same rows as table T1 described above, and further includes a "File Available?" row. In an embodiment, this row indicates whether the associated data is stored in the storage 150 (e.g., whether the data has been removed by the file removal service 228).

Further, the table T2 includes a "Processing Script(s)" row. In an embodiment, this row is used to store the location of processing scripts used by the data processing service 124 to process data after it has been retrieved. For example, the data processing service 124 can, after processing retrieved data, store in the data retrieval history 230 the path to the scripts used for the processing (including the machine in which those scripts are stored). This path can be a file path, a database path, a network address or URL, or any other suitable path identifying the location of the processing script. Further, in an embodiment, this row (or an additional row) stores input parameters used to operate the script. The data processing service 124 can provide these input parameters to the script when processing the retrieved data.

Figure 3:
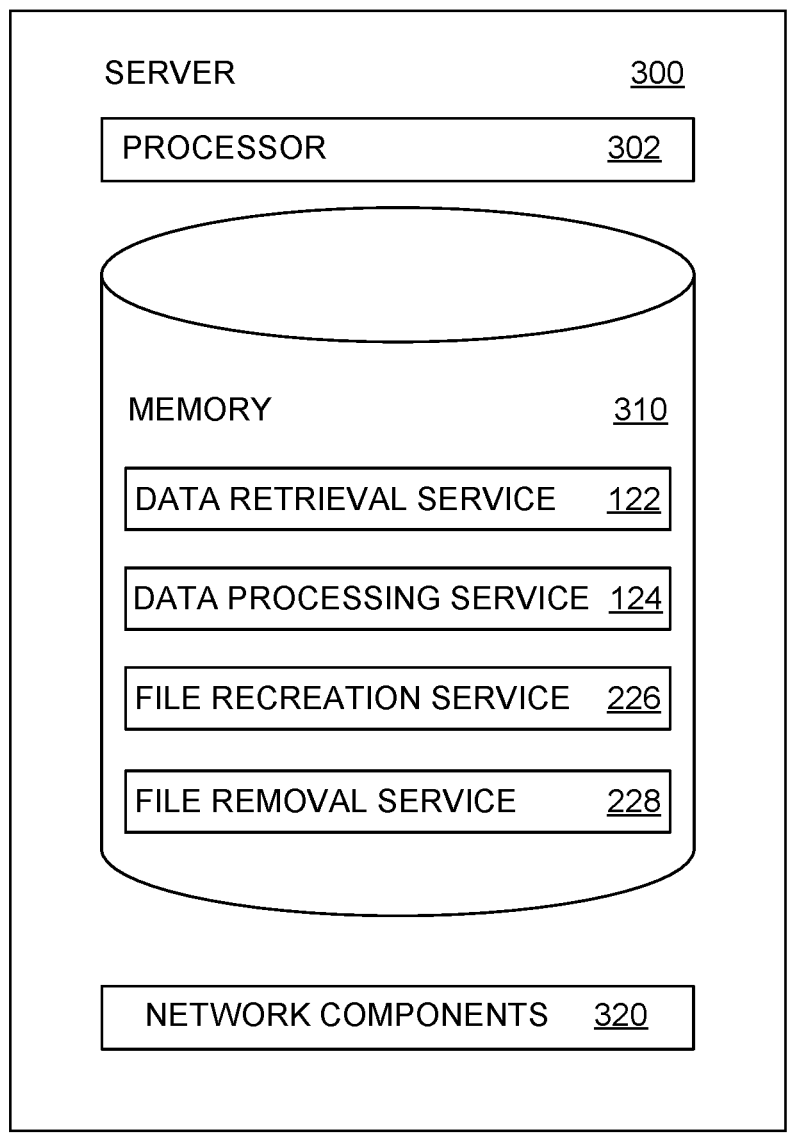
FIG. 3 illustrates a server running software services for continuous storage of data in a system with limited storage capacity, according to one embodiment.

FIG. 3 illustrates a server 300 running software services for continuous storage of data in a system with limited storage capacity, according to one embodiment. The server 300 includes a processor 302, a memory 310, and network components 320. The processor 302 generally retrieves and executes programming instructions stored in the memory 310. The processor 302 is included to be representative of a single central processing unit (CPU), multiple CPUs, a single CPU having multiple processing cores, graphics processing units (GPUs) having multiple execution paths, and the like. Further, the server 300 can be a single server computer, or can represent a collection of server computers (e.g., managed together).

The network components 320 include the components necessary for the server 300 to interface with a wireless or wired communication network (e.g., to communicate with the users 102 and the data source 110 illustrated in FIGS. 1 and 2). For example, the network components 320 can include WiFi or cellular network interface components and associated software, or wired network interface components (e.g., Ethernet components, fiber optic components, etc.).

Although the memory 310 is shown as a single entity, the memory 310 may include one or more memory devices having blocks of memory associated with physical addresses, such as random access memory (RAM), read only memory (ROM), flash memory, or other types of volatile and/or non-volatile memory. The memory 310 generally includes program code for performing various functions related to use of the server 300. The program code is generally described as various functional "applications" or "modules" within the memory 310, although alternate implementations may have different functions and/or combinations of functions.

The memory 310 includes a data retrieval service 122. In an embodiment, this is the data retrieval service 122 illustrated in FIGS. 1-2. As discussed in those figures, the data retrieval service 122 facilitates retrieval and storage of data (e.g., from a data source 110 as illustrated in FIGS. 1 and 2). The memory 310 further includes a data processing service 124. In an embodiment, this is the data processing service 124 illustrated in FIGS. 1-2. As discussed in those figures, the data processing service 124 processes data downloaded from a data source (e.g., performing transformations on the data or filtering the data).

The memory 310 further includes a file removal service 228. In an embodiment, this is the file removal service 228 illustrated in FIG. 2. As discussed in FIG. 2, the file removal service 228 facilitates removal of previously downloaded files, to save space, while facilitating continuous storage of data.

The memory 310 further includes a file recreation service 226. In an embodiment, this is the file recreation service 226 illustrated in FIG. 2. As discussed in FIG. 2, the file recreation service 226 facilitates recreation of files that have been downloaded and then removed to save storage space (e.g., using the file removal service 228).

As illustrated in FIG. 3, the services 122, 124, 226, and 228 are implemented in the server 300. This is merely one example. Alternatively, the services 122, 124, 226, and 228 could each run on a separate server, or any combination of services can run on any number of servers. Further, a particular service can be spread across multiple servers (e.g., for load management).

Figure 4:
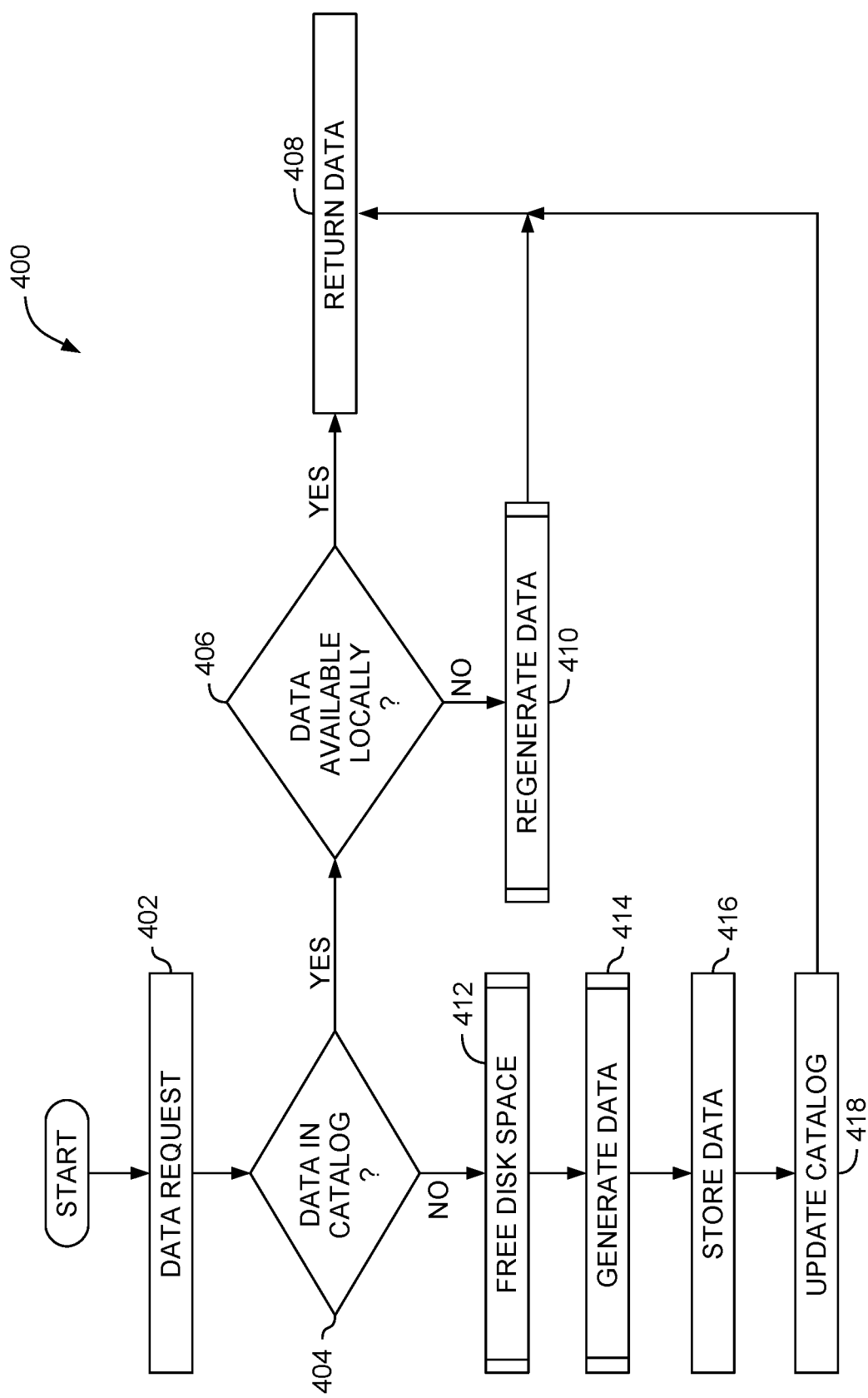
FIG. 4 is a flowchart for continuous storage of data in a system with limited storage capacity, according to one embodiment.

FIG. 4 is a flowchart 400 for continuous storage of data in a system with limited storage capacity, according to one embodiment. At block 402, a user (e.g., one of the users 102 illustrated in FIGS. 1-2) requests data (e.g., from storage 150 or a data source 110 illustrated in FIGS. 1-2). In an embodiment, the user transmits a data request to a data retrieval service (e.g., the data retrieval service 122 illustrated in FIGS. 1-3).

At block 404, the data retrieval service checks whether the requested data has metadata listed in a catalog (e.g., the catalog 240 illustrated in FIG. 2). Data listed in a catalog indicates, for example, that the data retrieval service has previously downloaded the requested data (e.g., the user, or another user, has previously requested the data). For example, the data retrieval service can use the "File Available?" row illustrated in the table T2 to determine whether the data is available in the storage 150. If block 404 is answered affirmatively, the flow proceeds to block 406 where the data retrieval service checks whether the requested data is available locally. For example, using the example of Table 2, the catalog can include a "File Available?" row in a data retrieval history (e.g., the data retrieval history 230 illustrated in FIG. 2).

If this block returns true, the requested data is available locally. The flow progresses to block 408, and the data retrieval service returns the requested data. Alternatively, the data retrieval service can return the local file-path for the requested data. In an embodiment, this local file-path can also be stored as part of the data retrieval history in the catalog.

Returning to block 406, if the requested data is not available locally, the flow proceeds to block 410. At block 410, file recreation service (e.g., the file recreation service 226 illustrated in FIGS. 2-3) regenerates the requested data. In an embodiment, the file recreation service downloads the requested data from the associated data source and runs any additional processing on the data. Further, the file recreation service can use the data retrieval service and a data processing service (e.g., the data processing service 124 illustrated in FIGS. 1-3) to perform these actions. This is discussed further with regard to FIG. 5.

In an embodiment, the file recreation service can track recreation of data. For example, a monitoring service can be provided to a system administrator identifying data that has been recreated. This can be a real-time monitoring system, a log, or any other suitable system. The system administrator can use the monitoring system to identify data that is repeatedly being recreated, to allow the system administrator to resolve any problems (e.g., changing file removal parameters to avoid churn). The monitoring system can further include CPU usage, memory usage, bandwidth usage, etc.

In an embodiment, the file recreation system can further provide alerts to a system administrator when data is recreated. This can allow the system administrator to determine that the storage (e.g., the storage 150 illustrated in FIGS. 1-2) does not include sufficient space. For example, while one or more of the techniques illustrated herein can facilitate continuous storage of data, without errors, repeated removal and recreation of data can use system resources (e.g., network bandwidth to retrieve the data and CPU resources to process the data). The system administrator can use the alerts to identify data that is being repeatedly removed and recreated, and to determine whether additional space should be added (or allocated) to avoid removal and recreation.

The flow then proceeds to block 408. At block 408, as discussed above, the file recreation service returns the requested data, or an identifier for the requested data (e.g., a file path).

Returning to block 404, if the data does not include associated metadata in the catalog, the flow proceeds to block 412. This means, for example, that the data retrieval service has not previously downloaded the requested data. At block 412, a file removal service (e.g., the file removal service 228 illustrated in FIGS. 2-3) frees disk space (if necessary). This is discussed further with regard to FIG. 6, below. In an embodiment, this can avoid disk space errors. Without freeing disk space, retrieving and processing the requested data could end up using more disk space than is available, resulting in an error. The file removal service can avoid these errors by freeing disk space at block 412, before retrieving and processing the data.

At block 414 the data retrieval service generates the requested data. In an embodiment, the data retrieval service downloads the requested data and the data processing service runs any additional processing on the data. This is discussed further with regard to FIG. 7, below.

At block 416 the data retrieval service, or another suitable service (e.g., the file recreation service), stores the data (e.g., in the storage 150 illustrated in FIGS. 1-2). As discussed above in connection with FIG. 1, in an embodiment, the data is stored locally on the client device that requested the data (e.g., on a user's local hard drive). Alternatively, or in addition, the data is stored in a system accessible to the user (e.g., via a communication network). For example, the user may be part of a research organization that maintains a system for use with ongoing projects (e.g., a network filesystem, database, or cloud storage system). The storage location can be remote from the user, accessible to the user over a communication network.

At block 418, the data retrieval service updates the catalog. As discussed above in relation to FIG. 2, in an embodiment the data retrieval service maintains a catalog (e.g., the catalog 240) with a data retrieval history (e.g., the data retrieval history 230). This data retrieval history includes various data relating to the retrieved data. Table 2, above, is one example of suitable data. At block 418, the data retrieval service updates the data retrieval history in the catalog (e.g., updates the download size, download speed, data processing statistics, etc.). The flow then proceeds to block 408 and, as discussed above, returns the data.

Figure 5:
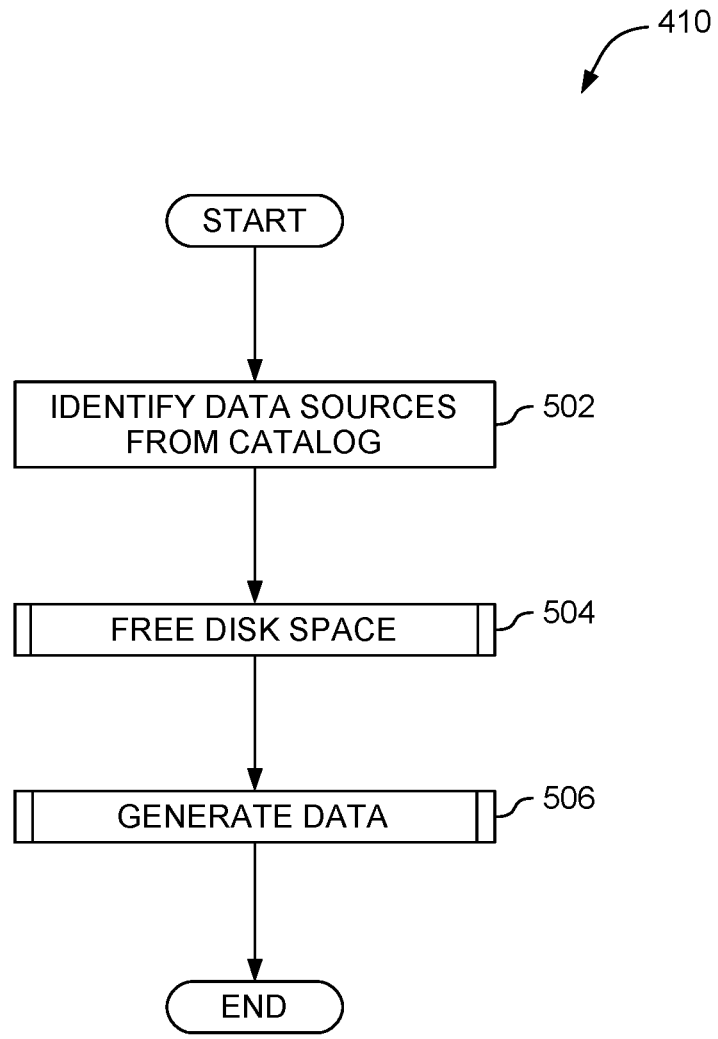
FIG. 5 is a flowchart for regenerating data as part of continuous storage of data in a system with limited storage capacity, according to one embodiment.

FIG. 5 is a flowchart for regenerating data as part of continuous storage of data in a system with limited storage capacity, according to one embodiment. In an embodiment, FIG. 5 corresponds with block 410, illustrated in FIG. 4. At block 502, a file recreation service (e.g., the file recreation service 226 illustrated in FIGS. 2-3) identifies the data sources for the requested data from a catalog (e.g., the catalog 140 illustrated in FIG. 2). In an embodiment, the file recreation service reads the catalog entry associated with the requested data (e.g., a database table) and identifies the data source information stored in the catalog (e.g., the URL or mirror URL). For example, the file recreation service can use the "Data Source(s)" row illustrated in the table T2.

At block 504, the file recreation service (or the file removal service or another suitable service) frees the necessary disk space. In an embodiment, block 504 corresponds with block 412 illustrated in FIG. 4. This is discussed further with regard to FIG. 6, below.

At block 506, the file recreation service generates the data. In an embodiment, block 506 corresponds with block 414 illustrated in FIG. 4. For example, at block 506 the file recreation service can download the requested data and can run any additional processing on the data. This is discussed further with regard to FIG. 7, below.

Figure 6:
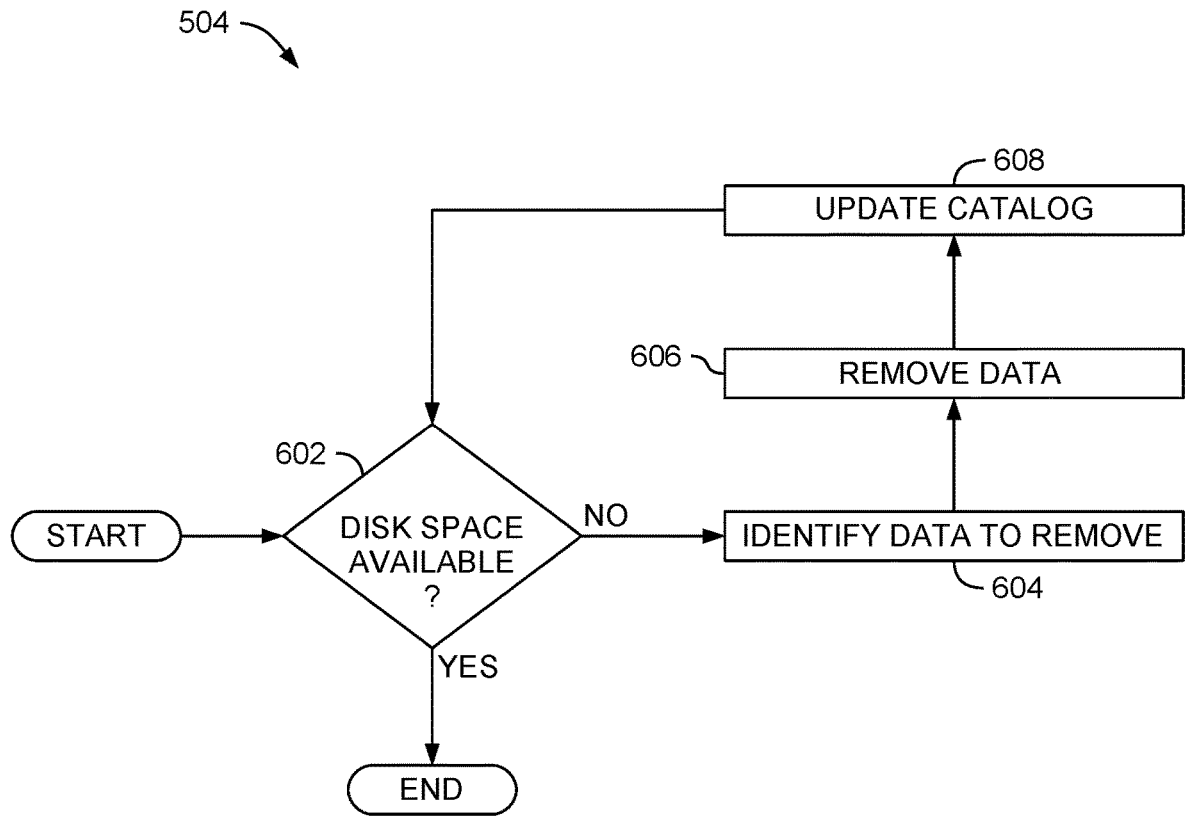
FIG. 6 is a flowchart for freeing disk space as part of continuous storage of data in a system with limited storage capacity, according to one embodiment.

FIG. 6 is a flowchart for freeing disk space as part of continuous storage of data in a system with limited storage capacity, according to one embodiment. In an embodiment, FIG. 6 corresponds with blocks 412 (illustrated in FIG. 4) and 504 (illustrated in FIG. 5).

At block 602, a file recreation service (e.g., the file recreation service 226 illustrated in FIGS. 2-3), or another suitable service, determines whether disk space is available. In an embodiment, the service identifies the amount of free space available in the storage (e.g., the storage 150 illustrated in FIGS. 1-2) and the amount of space necessary for the retrieved data. If the data has been retrieved previously and has an associated catalog entry, the catalog can be used to determine the amount of necessary storage space. Alternatively, the file recreation service can determine the amount of necessary storage space from the data source (e.g., the data source 110 illustrated in FIGS. 1-2).

If sufficient disk space is available, the flow ends. If sufficient disk space is not available, the flow proceeds to block 604. At block 604, a file removal service (e.g., the file removal service 228 illustrated in FIGS. 2-3) identifies data for removal (e.g., one or more files). In an embodiment, the file removal service uses the catalog to identify data for removal. The file removal service can identify data that can most easily be regenerated, based on the recreation parameters stored in the catalog (e.g., download size, download time, processing time, etc.).

For example, the file removal service can use the "Data Size" row illustrated in the table T2 to identify the data that was the smallest to download. The file removal service can use the "Time to Download" row illustrated in the table T2 to identify the data that was the quickest to download. The file removal service can use the "Time to Process" row illustrated in the table T2 to identify the data that was the quickest to process. The file removal service can use the "CPU Resources Used" row in the table to T2 to identify the data that used the fewest CPU resources to process. The file removal service can use the "Memory Used" row illustrated in the table T2 to identify the data that used the fewest memory resources to process. These are merely examples. The file removal service can use any (or all) of these rows, along with other data, to identify data for removal.

Further, the file removal service can identify data that is used infrequently, is likely to be out of date, etc. For example, the catalog can track when data was last accessed, and how often the data is accessed (e.g., as a row in the table T2), and that can be used to identify data that is used infrequently. These are merely examples, and any suitable parameters can be used.

In an embodiment, the file removal service includes default parameters for identifying data for removal. A user or administrator can configure these parameters (e.g., using a suitable user interface). Alternatively, the file removal service can include parameters that cannot be altered by a user.

As another example, the file removal service can consider cloud storage related costs when identifying data to be removed. Many cloud systems charge for processing power, network bandwidth, storage, etc. The file removal service can use the data included in the catalog to estimate the cost associated with recreating data that is removed, and can include that as a factor in its decision. Further, the cloud parameters (e.g., a flag indicating cloud storage, processing costs, bandwidth costs, storage costs, etc.) can themselves be stored in the catalog or another suitable location and used by the file removal service to generate the cost estimate.

Further, the file removal service can avoid removing data that cannot be recreated. For example, data may not have a corresponding entry in the catalog, or the catalog entry may be incomplete. The file removal service can avoid removing this data. As another example, data may be marked in the catalog as being procured from a source that may not be available in the future. For example, the catalog can include an additional field (e.g., a row or column) with this information. The file removal service can also avoid removing this data.

The file removal service can also verify that the data is still available from the data source before removing the data. For example, the file removal service can attempt to begin retrieval of the requested data (e.g., from the data source 110 illustrated in FIGS. 1-2), using the location included in the catalog. If this is not successful (e.g., the file removal service receives an error), the file removal service can avoid removing the data.

As another alternative, the catalog can include a field identifying whether the data is available from the data source 110. Instead of (or in addition to) checking availability before deletion, the file removal service can operate in the background, periodically, and update this field to identify data that is no longer available. For example, the file removal service can operate when the system is has low usage, or at prescribed times, to check current availability for data identified in the catalog.

At block 606, the file removal service removes the identified data from storage (e.g., the storage 150 illustrated in FIGS. 1-2). For example, the file removal service can use the "Filesystem Path" row illustrated in Table T2 to identify the storage location for the identified data. The file removal service can then remove that data.

At block 608, the file removal service updates the catalog. For example, the catalog can include an entry identifying whether the data is available in the storage (e.g., the "File Available?" row illustrated in Table 2, above). The file removal service can toggle this value from true (e.g., available) to false (e.g., not available). The flow then returns to block 602.

Figure 7:
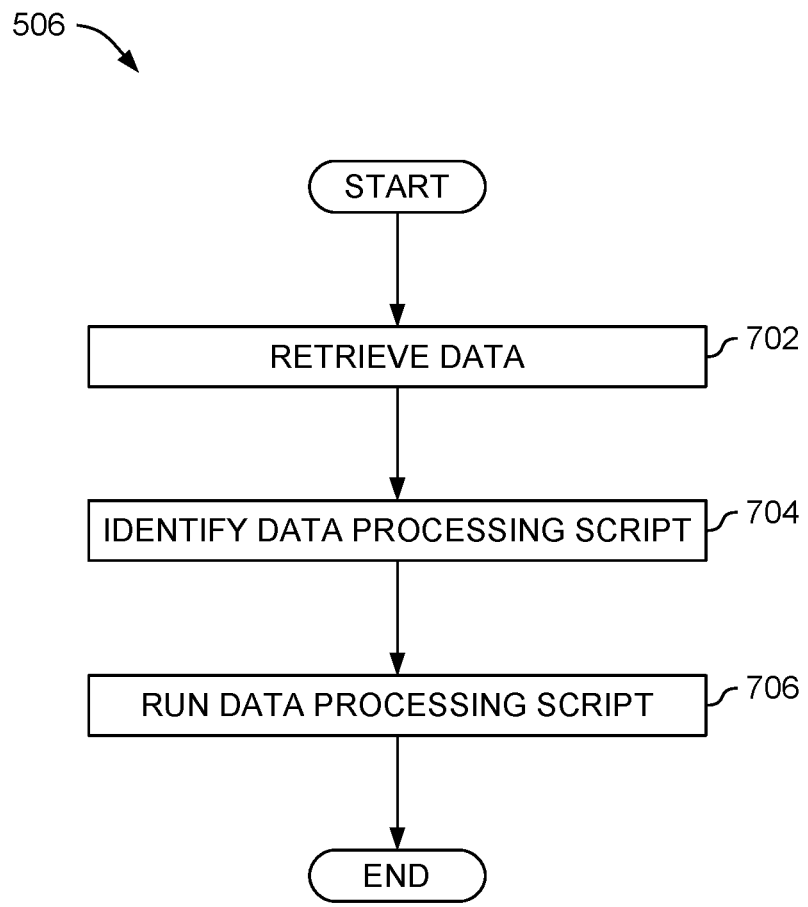
FIG. 7 is a flowchart for regenerating requested data as part of continuous storage of data in a system with limited storage capacity, according to one embodiment.

FIG. 7 is a flowchart for generating requested data as part of continuous storage of data in a system with limited storage capacity, according to one embodiment. In an embodiment, FIG. 7 corresponds with blocks 414 (illustrated in FIG. 4) and 506 (illustrated in FIG. 5). At block 702 a data retrieval service (e.g., the data retrieval service 122 illustrated in FIGS. 2-3) retrieves the requested data from the data source (e.g., the data source 110 illustrated in FIGS. 1-2).

At block 704, a data processing service (e.g., the data processing service 124 illustrated in FIGS. 2-3) identifies any data processing script associated with the requested data. For example, a user may have identified a filter, transform, or other processing script to run on the data after it is retrieved, and may have provided input parameters for the script. In an embodiment, a data processing script is stored as a series of steps (e.g., a human-readable programming language script or a machine-readable compiled script). The script can be stored in a file, in a database table, or in any other suitable fashion. Alternatively, a script is available at a network location and can be called using the data processing service (e.g., using a network API). Any input parameters can also be stored in the script itself, in a database table, or in any other suitable location. For example, the "Processing Script(s)" row illustrated in the Table T2 can identify the path (e.g., file path, database path, or network path) for the scripts, along with any input parameters.

In an embodiment, the data has previously been generated, and is now being regenerated (e.g., as discussed above with respect to FIG. 5). A file recreation service identifies the script using information in the catalog (e.g., a file-path or database-path, as discussed above with regard to FIG. 2) and, if necessary, retrieves the script and any input parameters to use with the script. Alternatively, the file recreation service, or another suitable service (e.g., the data processing service), can query the user to identify an existing script, or to enter the steps of a desired script. In an embodiment, the file recreation service (or another suitable service) can store the steps of the script, and the storage path in the catalog, so that the script can be used if the data is later regenerated.

At block 706, the data processing service runs the script to process the retrieved data. For example, if the script is retrieved from storage, the data processing service can run the script with the input parameters (e.g., run a Python script or any other suitable script). As another example, if the script is available at a network location, the data processing service can call the network location, pass it the input parameters, and receive the data output (or receive an identification of the location of the data output). The data processing service (or another suitable service) can store the processed data, along with (or instead of) the retrieved data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., one or more of the services 122, 124, 226, and 228 illustrated in FIG. 3) or related data available in the cloud. For example, the data retrieval service 122, data processing service 124, file recreation service 226, and file removal service 228 could execute on a computing system in the cloud and facilitate continuous storage of data in a system with limited storage capacity. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
   receiving a request to access data at a first storage location;
   determining, based on a catalog and using a computer processor, that the data has been removed from the first storage location, and in response automatically recreating the data at the first storage location using the computer processor, the recreating comprising:
      identifying a second storage location for the data, based on the catalog;
      retrieving the data from the second storage location;
      determining, based on a first amount of storage space required to store the data at the first storage location and a second amount of available storage space at the first storage location, to free storage space at the first storage location;
      identifying a file to remove from the first storage location based on determining, using the catalog, that the file is available from a publicly accessible third storage location different from the first storage location;
      removing the file from the first storage location; and
      storing the data at the first storage location; and
   updating the catalog to reflect recreating the data at the first storage location.

2. The method of claim 1, wherein the first storage location is not publicly accessible, wherein the second storage location is publicly accessible, and wherein the catalog comprises at least one of: (i) a table in an electronic database or (ii) metadata associated with the data.

3. The method of claim 1, wherein the recreating the data further comprises:
   updating the catalog to reflect removing the file from the first storage location.

4. The method of claim 1, wherein the identifying the file to remove from the first storage location, further comprises:
   selecting the file to remove, from among a plurality of files identified in the catalog, based on one or more recreation parameters associated with the file and stored in the catalog.

5. The method of claim 4, wherein the recreation parameters comprise one or more of: (i) a time to download the file, (ii) a time to process the file, (iii) an amount of processing resources used to process the file, or (iv) an amount of memory resources used to process the file.

6. The method of claim 1, wherein automatically recreating the data at the first storage location further comprises:
   identifying a script used to process the data, comprising:
      retrieving identifying information relating to the script from the catalog, wherein the identifying information was previously added to the catalog prior to the data having been removed from the first storage location;
   processing the retrieved data, using the script; and
   storing the processed data at the first storage location.

7. The method of claim 6, wherein processing the retrieved data, using the script, further comprises:
   identifying at least one input parameter associated with the processing; and
   providing the at least one input parameter to the script, wherein the script changes one or more values for the data based on the at least one input parameter.

8. The method of claim 6, wherein the script comprises at least one of: (i) a file comprising one or more processing steps or (ii) a software service accessible at a network location.

9. The method of claim 6, wherein the identifying information was previously added to the catalog as part of initially creating the data at the first storage location.

10. A system, comprising:
a processor; and
a memory containing a program that, when executed on the processor, performs an operation, the operation comprising:
  receiving a request to access data at a first storage location;
  determining, based on a catalog and using the processor, that the data has been removed from the first storage location, and in response automatically recreating the data at the first storage location using the processor, the recreating comprising:
    identifying a second storage location for the data, based on the catalog;
    retrieving the data from the second storage location;
    determining, based on a first amount of storage space required to store the data at the first storage location and a second amount of available storage space at the first storage location, to free storage space at the first storage location;
    identifying a file to remove from the first storage location based on determining, using the catalog, that the file is available from a publicly accessible third storage location different from the first storage location;
    removing the file from the first storage location; and
    storing the data at the first storage location; and
  updating the catalog to reflect recreating the data at the first storage location.

11. The system of claim 10, wherein the first storage location is not publicly accessible, wherein the second storage location is publicly accessible, and wherein the catalog comprises at least one of: (i) a table in an electronic database or (ii) metadata associated with the data.

12. The system of claim 10, wherein the recreating the data further comprises:
  updating the catalog to reflect removing the file from the first storage location.

13. The system of claim 10, wherein the identifying the file to remove from the first storage location, further comprises:
  selecting the file to remove, from among a plurality of files identified in the catalog, based on one or more recreation parameters associated with the file and stored in the catalog, the recreation parameters comprising at least one of:
  (i) a time to download the file, (ii) a time to process the file, (iii) an amount of processing resources used to process the file, or (iv) an amount of memory resources used to process the file.

14. The system of claim 10, wherein automatically recreating the data at the first storage location further comprises:
  identifying a script used to process the data, comprising:
    retrieving identifying information relating to the script from the catalog, wherein the identifying information was previously added to the catalog prior to the data having been removed from the first storage location;
  processing the retrieved data, using the script; and
  storing the processed data at the first storage location.

15. A computer program product for automatically recreating data removed from storage, the computer program product comprising:
a computer-readable storage medium having computer-readable program code embodied therewith, the computer-readable program code executable by one or more computer processors to perform an operation, the operation comprising:
  receiving a request to access data at a first storage location;
  determining, based on a catalog, that the data has been removed from the first storage location, and in response automatically recreating the data at the first storage location, the recreating comprising:
    identifying a second storage location for the data, based on the catalog;
    retrieving the data from the second storage location;
    determining, based on a first amount of storage space required to store the data at the first storage location and a second amount of available storage space at the first storage location, to free storage space at the first storage location;
    identifying a file to remove from the first storage location based on determining, using the catalog, that the file is available from a publicly accessible third storage location different from the first storage location;
    removing the file from the first storage location; and
    storing the data at the first storage location; and
  updating the catalog to reflect recreating the data at the first storage location.

16. The computer program product of claim 15, wherein the first storage location is not publicly accessible, wherein the second storage location is publicly accessible, and wherein the catalog comprises at least one of: (i) a table in an electronic database or (ii) metadata associated with the data.

17. The computer program product of claim 15, wherein the recreating the data further comprises:
  updating the catalog to reflect removing the file from the first storage location.

18. The computer program product of claim 15, wherein the identifying the file to remove from the first storage location, further comprises:
  selecting the file to remove, from among a plurality of files identified in the catalog, based on one or more recreation parameters associated with the file and stored in the catalog, the recreation parameters comprising at least one of:
  (i) a time to download the file, (ii) a time to process the file, (iii) an amount of processing resources used to process the file, or (iv) an amount of memory resources used to process the file.

19. The computer program product of claim 15, wherein automatically recreating the data at the first storage location further comprises:
  identifying a script used to process the data, comprising:
    retrieving identifying information relating to the script from the catalog, wherein the identifying information was previously added to the catalog prior to the data having been removed from the first storage location;
  processing the retrieved data, using the script; and
  storing the processed data at the first storage location.

\* \* \* \* \*